US012526943B2

(12) United States Patent
Wu

(10) Patent No.: US 12,526,943 B2
(45) Date of Patent: Jan. 13, 2026

(54) DISPLAY PANEL AND METHOD FOR MANUFACTURING THE SAME, AND DISPLAY APPARATUS

(71) Applicant: Hubei Yangtze Industrial Innovation Center Of Advanced Display Co., Ltd., Wuhan (CN)

(72) Inventor: Shouzheng Wu, Wuhan (CN)

(73) Assignee: Hubei Yangtze Industrial Innovation Center Of Advanced Display Co., Ltd., Wuhan (CN)

( * ) Notice: Subject to any disclaimer, the term of this patent is extended or adjusted under 35 U.S.C. 154(b) by 398 days.

(21) Appl. No.: 18/147,900

(22) Filed: Dec. 29, 2022

(65) Prior Publication Data

US 2023/0136816 A1    May 4, 2023

(30) Foreign Application Priority Data

Oct. 27, 2022   (CN) .......................... 202211329275.0

(51) Int. Cl.
| | |
|---|---|
| H05K 5/00 | (2025.01) |
| G02F 1/1333 | (2006.01) |
| G02F 1/1343 | (2006.01) |
| H05K 5/03 | (2006.01) |

(52) U.S. Cl.
CPC ........... H05K 5/03 (2013.01); G02F 1/13336 (2013.01); G02F 1/1343 (2013.01)

(58) Field of Classification Search
CPC ...... H05K 5/03; G02F 1/13336; G02F 1/1343
See application file for complete search history.

(56) References Cited

U.S. PATENT DOCUMENTS

| | | | |
|---|---|---|---|
| 5,867,236 A * | 2/1999 | Babuka | G09G 3/20 |
| | | | 349/190 |
| 9,709,838 B2 * | 7/2017 | Jung | G02F 1/13336 |
| 11,164,934 B2 * | 11/2021 | Bower | G06F 3/147 |

FOREIGN PATENT DOCUMENTS

| | | | | |
|---|---|---|---|---|
| CN | 101261997 A * | 9/2008 | ............. | G09F 9/335 |
| CN | 102748659 A | 10/2012 | | |
| CN | 107742480 A * | 2/2018 | ............. | G09F 9/301 |
| CN | 108230913 A | 6/2018 | | |

(Continued)

OTHER PUBLICATIONS

Office Action mailed Apr. 21, 2025; issued in corresponding Chinese Application No. 202211329275.0; Filed Oct. 27, 2022; 24 pages.

(Continued)

*Primary Examiner* — Jerry Wu
*Assistant Examiner* — Rashen E Morrison
(74) *Attorney, Agent, or Firm* — CHRISTENSEN O'CONNOR JOHNSON KINDNESS PLLC

(57) ABSTRACT

Provided is a display panel and a method for manufacturing the display panel, and a display apparatus. The display panel includes a cover and a display unit array that are opposite to each other. The display unit array includes at least two display units spliced together. Each display unit has a pixel region and a peripheral region at least partially surrounding the pixel region. Each display unit includes pins provided in the peripheral region. The cover includes connection electrodes. At a splicing position, the pins of two adjacent display units are electrically connected by a connection electrode of the connection electrodes.

18 Claims, 12 Drawing Sheets

(56) References Cited

FOREIGN PATENT DOCUMENTS

| CN | 112786760 | A |   | 5/2021  |     |           |
|----|-----------|---|---|---------|-----|-----------|
| CN | 113593424 | A | * | 11/2021 | ... | G09F 9/302 |
| CN | 216980016 | U |   | 7/2022  |     |           |
| CN | 115116347 | A | * | 9/2022  | ... | G09F 9/335 |

OTHER PUBLICATIONS

Office Action mailed Sep. 15, 2025; issued in corresponding Chinese Application No. 202211329275.0; Filed Oct. 27, 2022; 27 pages.

* cited by examiner

DISPLAY PANEL AND METHOD FOR MANUFACTURING THE SAME, AND DISPLAY APPARATUS

CROSS-REFERENCE TO RELATED APPLICATIONS

The present application claims priority to Chinese Patent Application No. 202211329275.0, filed on Oct. 27, 2022, the content of which is incorporated herein by reference in its entirety.

TECHNICAL FIELD

The present disclosure relates to the field of display technologies, and in particular, to a display panel, a method for manufacturing a display panel, and a display apparatus.

BACKGROUND

Current large-sized display panels, such as billboards, are typically formed by splicing multiple small-sized display units together. In order to realize communication between the display units, the adapter plates are provided at the splicing position of display units for connection. Due to the presence of the adapter plates, relatively large gaps are formed at the splicing position of the display units, which may form a display dark fringe, thereby affecting the display.

SUMMARY

In a first aspect, the present disclosure provides a display panel. In some embodiments, the display panel includes a cover and a display unit array that are opposite to each other. The display unit array may include at least two display units that are spliced together. Each of the at least two display units may include: a pixel region, a peripheral region at least partially surrounding the pixel region, and pins arranged in the peripheral region. The cover may include connection electrodes. In some embodiments, at an at least one splicing position, the pins of two adjacent display units of the at least two display units are electrically connected by a connection electrode of the connection electrodes.

In a second aspect, the present disclosure provides a display apparatus including a display panel. The display panel may include a cover and a display unit array that are opposite to each other. The display unit array may include at least two display units that are spliced together. Each of the at least two display units includes a pixel region, a peripheral region at least partially surrounding the pixel region, and pins arranged in the peripheral region. The cover includes connection electrodes. In some embodiments, at an at least one splicing position, the pins of two adjacent display units of the at least two display units are electrically connected by a connection electrode of the connection electrodes.

In a third aspect, the present disclosure provides a method for manufacturing a display panel. The method may include providing a substrate, and forming connection electrodes on the substrate to form a cover including the connection electrodes, providing at least two display units, where each of the display units includes a pixel region, a peripheral region at least partially surrounding the pixel region, and pins arranged in the peripheral region; and aligning and attaching the at least two display units to the cover in such a manner that the at least two display units are spliced to form a display unit array. The display unit array is opposite to the cover. At an at least one splicing position, the pins of two adjacent display units are electrically connected by a connection electrode of the connection electrodes.

BRIEF DESCRIPTION OF DRAWINGS

In order to more clearly illustrate the embodiments of the present disclosure, the accompanying drawings used in the embodiments are briefly described below. The drawings described below are merely a part of the embodiments of the present disclosure. The accompanying drawings in the following description are some embodiments of the present disclosure, and other accompanying drawings can be obtained in accordance with these drawings for those skilled in the art.

DESCRIPTION OF EMBODIMENTS

In order to make the purpose, technical solutions and advantages of the embodiments of the present disclosure clearer, the technical solutions in the embodiments of the present disclosure will be described clearly and completely below in conjunction with the accompanying drawings in the embodiments of the present disclosure, and it is clear that the embodiments described are some embodiments of the embodiments of the present disclosure, rather than all embodiments of the present disclosure. Based on the embodiments in the present disclosure, all other embodiments obtained by those of ordinary skill in the art fall within the scope of protection of the present disclosure.

The terms used in the embodiments of the present disclosure are merely for the purpose of describing particular embodiments and not intended to limit the present disclosure. Unless otherwise noted in the context, the expressions "a", "an", "the" and "the" in a singular form used in the embodiments and appended claims of the present disclosure are also intended to represent a plural form.

The present disclosure provides a splicing display panel. In some embodiments, connection electrodes are provided on a cover, and at a splicing position of two display units, pins of the two display units are electrically connected through the connection electrode, so that the connection electrodes on the cover can be used to realize the communication between the spliced display units without providing the adapter plate between the adjacent display units, which can reduce the splicing gap between the adjacent display units, reduce dark fringe and improve display effect.

Figure 1:
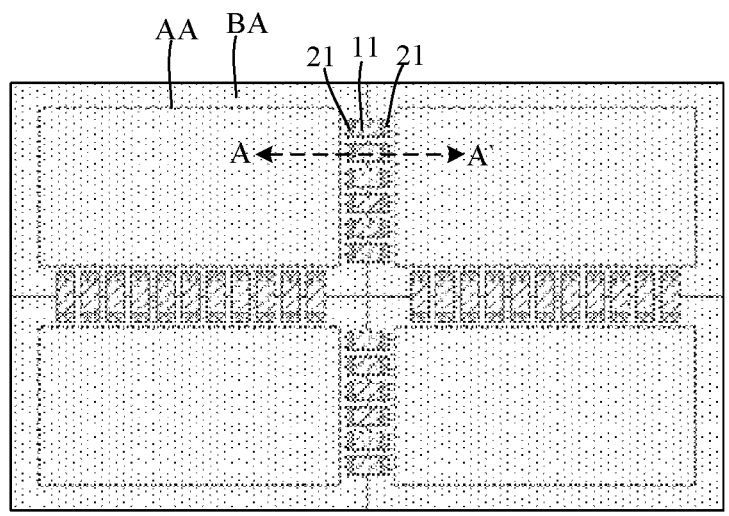
FIG. 1 is a schematic diagram of a display panel provided by some embodiments of the present disclosure.
Figure 2:
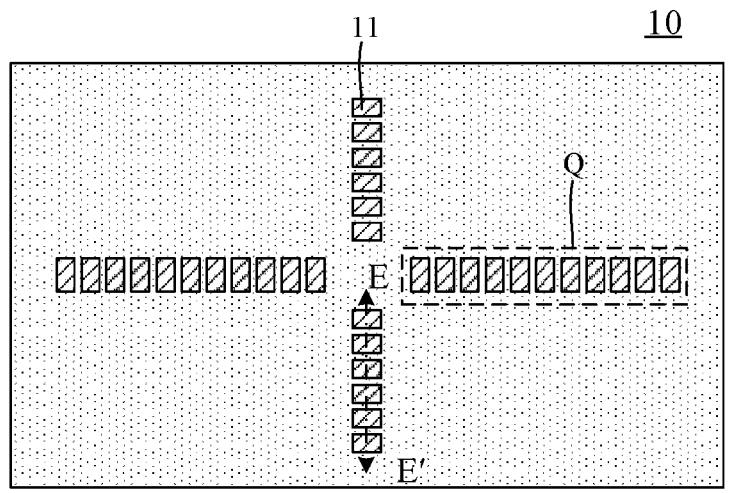
FIG. 2 is a schematic diagram of a cover of a display panel provided in embodiments of FIG. 1.
Figure 3:
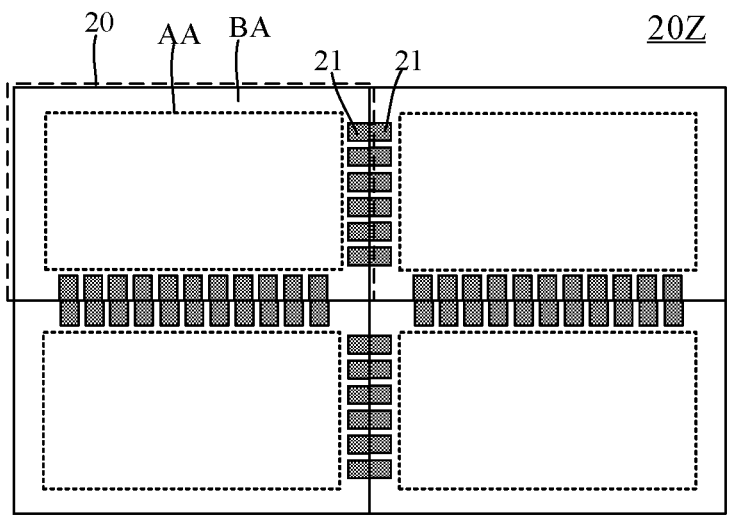
FIG. 3 is a schematic diagram of a display unit array of a display panel provided in embodiments of FIG. 1.
Figure 4:
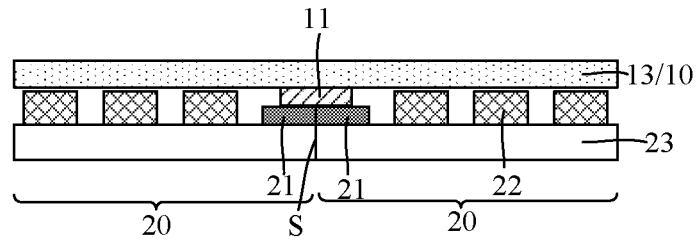
FIG. 4 is a cross-sectional view taken along line A-A' shown in FIG. 1.

FIG. 1 is a schematic diagram of a display panel provided by some embodiments of the present disclosure. FIG. 2 is a schematic diagram of a cover of the display panel provided by some embodiments of FIG. 1. FIG. 3 is a schematic diagram of a display unit array of the display panel provided by some embodiments of FIG. 1. FIG. 4 is a cross-sectional view taken along line A-A' shown in FIG. 1.

With reference to FIGS. 1 to 3, the display panel includes a cover 10 and a display unit array 20Z that are opposite to each other. The display unit array 20Z includes at least two display units 20 spliced together. FIG. 1 and FIG. 3 schematically illustrate that the display unit array 20Z includes four display units 20 arranged in a matrix of two rows and two columns.

The cover 10 includes multiple connection electrodes 11, that is, the connection electrodes 11 are formed on the cover 10. Adjacent connection electrodes 11 are insulated from each other. The position of the connection electrode 11 corresponds to a splicing position between the display units 20 (i.e., a position where the display units 20 are spliced).

The display unit 20 has a pixel region AA and a peripheral region BA at least partially surrounding the pixel region AA. At least one display unit 20 includes multiple pins 21 arranged in the peripheral region BA. Multiple light-emitting elements are arranged in the pixel region AA, and the light-emitting elements include at least three light-emitting elements emitting light of at least three colors including red, green, and blue. In some embodiments, the light-emitting elements are not limited to red light-emitting element, green light-emitting element, and blue light-emitting element, and can also include at least one light-emitting element emitting light of another color. In other embodiments, the light-emitting elements in the pixel region AA include light-emitting elements emitting light of two colors, or light-emitting elements emitting light of one color. The light-emitting elements are organic light-emitting diodes or inorganic light-emitting diodes.

In other embodiments, the display unit 20 is a liquid crystal display panel, and liquid crystal molecules, common electrodes, pixel electrodes and so on are provided in the pixel region AA. As shown in FIG. 4, the display unit 20 includes a substrate 23, and the light-emitting element 22 is located on a side of the substrate 23 close to the cover 10. The display unit 20 also includes a driver layer (not shown in the figures), and the driver layer is disposed between the substrate 23 and the light-emitting element 22. The driver layer includes multiple pixel circuits, and the pixel circuits are configured to drive the light-emitting elements 22 to emit light. A splicing gap S between two adjacent display units 20 is also illustrated in FIG. 4.

It can be seen from FIG. 1 and FIG. 4 that at an at least one splicing position, the pins 21 of two adjacent display units 20 are electrically connected by the connection electrode 11. That is, one end of the connection electrode 11 is electrically connected to a pin 21 of one display unit 20 of the two adjacent display units 20, and another end of the connection electrode 11 is electrically connected to a pin 21 located on the other display unit 20 of the two adjacent display units 20. The pins 21 located on two adjacent display units 20 are connected to each other through the connection electrode 11, realizing communication between the two adjacent display units 20.

The display panel provided by the embodiments of the present disclosure includes at least two display units 20 that are spliced together, and the pins 21 of the at least two spliced display units 20 are electrically connected through the connection electrodes 11 of the cover 10, so that the connection electrodes 11 of the cover 10 can be used to realize the communication between the spliced display units 20 without providing the adapter plate between the adjacent display units 20, which can reduce the splicing seam between the adjacent display units 20, reduce the dark fringe and improve the display effect. The connection electrodes 11 are formed on the cover 10, so that the connection electrodes 11 are manufactured with high precision, and the manufacturing process of the connection electrodes 11 does not affect the structure of the display unit 20. For example, when the connection electrode 11 is formed with a high-precision etching process, the etching solution used in the manufacturing process of the connection electrodes 11 negatively affecting the structure of the display unit 20, can be avoided.

In some embodiments, in conjunction with FIGS. 1 to 3, two pins 21 electrically connected by the connection electrode 11 are aligned with each other in a direction along which the connection electrode 11 extends. That is, the two pins 21 electrically connected to each other are arranged in the same direction as the extending direction of the connection electrode 11. Such configuration facilitates the alignment between the connection electrode 11 and the two pins 21, reduces the difficulty of aligning and connecting the connection electrode 11 with the pins 21, and simplifies the process.

Figure 5:
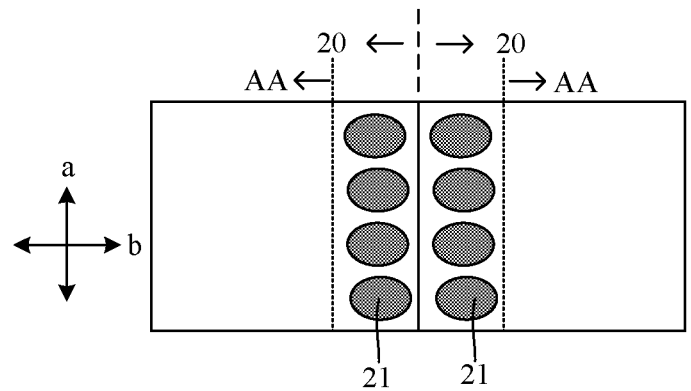
FIG. 5 is a partial schematic view of another display panel provided by some embodiments of the present disclosure.

A shape of the pin 21 is shown as a rectangle in FIG. 3, and the shape of the pin 21 is not limited in the embodiments of the disclosure. FIG. 5 is a partial schematic diagram of another display panel provided by some embodiments of the present disclosure. FIG. 5 merely illustrates a partial position where two display units 20 are spliced together. In some embodiments, as shown in FIG. 5, the pin 21 of the display unit 20 is substantially round, For a display unit 20A, the pins 21 located at a side of the pixel region are arranged in a direction a. At a splicing position between two adjacent display units 20, two connected pins 21 of the two adjacent display units 20 are arranged in a direction b, and the two connected pins 21 are aligned with each other in the direction b. The direction a intersects with the direction b. In some embodiments, the direction a is perpendicular to the direction b.

FIG. 1 illustrates only the pixel region AA of each display unit 20 and does not illustrate the light-emitting elements in the pixel region AA. When multiple display units 20 are spliced together, the pixel regions AA of these display units 20 together form a display region of the display panel. In some embodiments, in a direction along which the light-emitting elements are arranged, a spacing between adjacent light-emitting elements that are respectively located in two display units 20 is equal to a spacing between adjacent two light-emitting elements located in one display unit 20, then the splicing position between two adjacent display units 20 is basically invisible the display panel displays images, which can improve the overall visual effect.

In some embodiments, as shown in FIG. 4, the cover 10 includes a substrate 13, and the connection electrodes 11 are in direct contact with the substrate 13. No adhesive layer is utilized to connect the connection electrodes 11 with the substrate 13. In the embodiments, the connection electrode 11 is formed directly on the substrate 13 using a film-forming and etching process. The connection electrodes 11 are formed with a high-precision etching process, so that the connection electrodes 11 are formed with a high precision, and the process of forming the connection electrodes 11 does not affect the structure of the display units 20.

Figure 6:
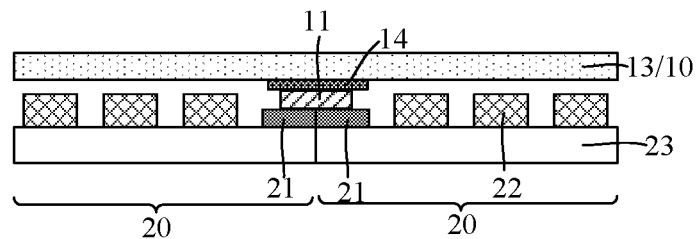
FIG. 6 is another cross-sectional view taken along line A-A' shown in FIG. 1.

FIG. 6 is another cross-sectional view taken along line A-A' shown in FIG. 1. FIG. 6 illustrates the splicing position between two display units 20. In some embodiments, as shown in FIG. 6, the cover 10 includes a substrate 13, and a light-blocking layer 14 is provided between the connection electrodes 11 and the substrate 13. The light-blocking layer 14 has the function of blocking ambient light. The light-blocking layer 14 is made of a light-absorbing material. When at least one of the connection electrode 11 or the pin 21 includes metal material and the ambient light is incident to the splicing position, the structure made of metal material may reflect the ambient light, resulting in reflection at the splicing position and affecting the visual effect. The light-blocking layer 14 blocks the ambient light, which prevents the reflections at the splicing position.

When manufacturing the cover 10, a substrate 13 is provided, and the light-blocking layer 14 is first formed on the substrate 13, and then the connection electrode 11 is formed on the light-blocking layer 14 so that the connection electrode 11 overlap with the light-blocking layer 14.

In some embodiments, an orthographic projection of the connection electrode 11 on a plane of the light-blocking layer 14 is within the light-blocking layer 14. In this way, the light blocking layer 14 can be used to completely shade the connection electrode 11, which prevents the connection electrode 11 from reflecting ambient light.

Figure 7:
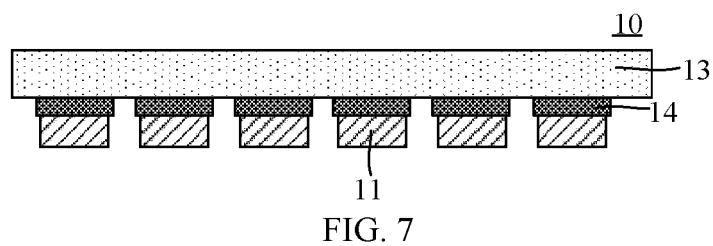
FIG. 7 is a cross-sectional view taken along line E-E' shown in FIG. 2.

FIG. 7 is a cross-sectional view taken along line E-E' shown in FIG. 2. FIG. 7 illustrates an electrode region where multiple connection electrodes 11 are arranged along a same direction. In some embodiments, as shown in FIG. 7, the connection electrodes 11 correspond to the light-blocking layers 14 in a one-to-one correspondence. Such configuration can reduce a total coverage area of the light-blocking layers 14, which can improve an overall light transmission rate of the display panel when applied in a transparent display.

Figure 8:
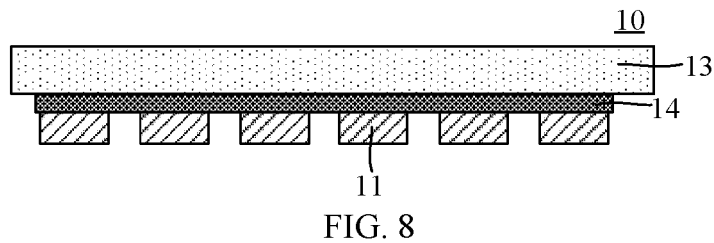
FIG. 8 is another cross-sectional view taken along line E-E' shown in FIG. 2.

FIG. 8 is another cross-sectional view taken along line E-E' shown in FIG. 2. FIG. 8 illustrates an electrode region where multiple connection electrodes 11 arranged in a same direction. In other embodiments, as shown in FIG. 8, the electrode region corresponds to one light-blocking layer 14, and the light-blocking layer 14 corresponds to all the connection electrodes 11 within the electrode region. In the embodiments, the light-blocking layer 14 is formed without high-precision etching, which can reduce the difficulty of forming the light-blocking layer 14 and simplify the process.

Figure 9:
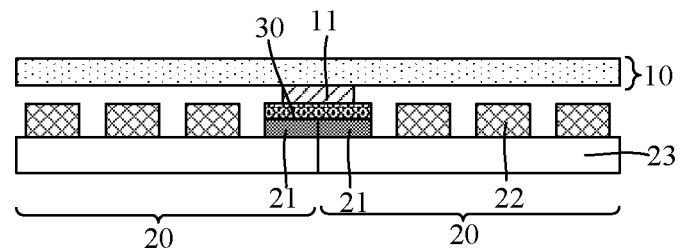
FIG. 9 is another cross-sectional view taken along line A-A' shown in FIG. 1.

FIG. 9 is another cross-sectional view taken along line A-A' shown in FIG. 1. FIG. 9 illustrates the position where the two display units 20 are spliced to each other. In some embodiments, as shown in FIG. 9, at an at least one splicing position, the pins 21 and the connection electrodes 11 are connected by a conductive structure 30. The conductive structure 30 includes at least one of a solder ball, a eutectic layer, or an anisotropic conductive adhesive.

In some embodiments, the solder ball or the eutectic layer is formed on the pin 21 of the display unit 20 when manufacturing the display panel, and the solder ball or the eutectic layer is used to electrically connect the pin 21 and the connection electrode 11 when the display unit 20 and the cover 10 are aligned and attached to each other.

In some embodiments, the anisotropic conductive adhesive is coated on the pin 21 of the display unit 20 when manufacturing the display panel, and conductive particles in the anisotropic conductive adhesive electrically connect the pin 21 and the connection electrode 11 due to compression when the display unit 20 and the cover 10 are aligned and attached to each other.

In some embodiments, taking FIG. 2 as an example, the cover 10 has at least one electrode region Q. FIG. 2 illustrates that the cover 10 has four electrode regions Q, and the four electrode regions Q correspond to four splicing positions in one-to-one correspondence. It can be seen from FIG. 1 that the electrode region Q is opposite to the splicing position between two adjacent display units 20.

Figure 10:
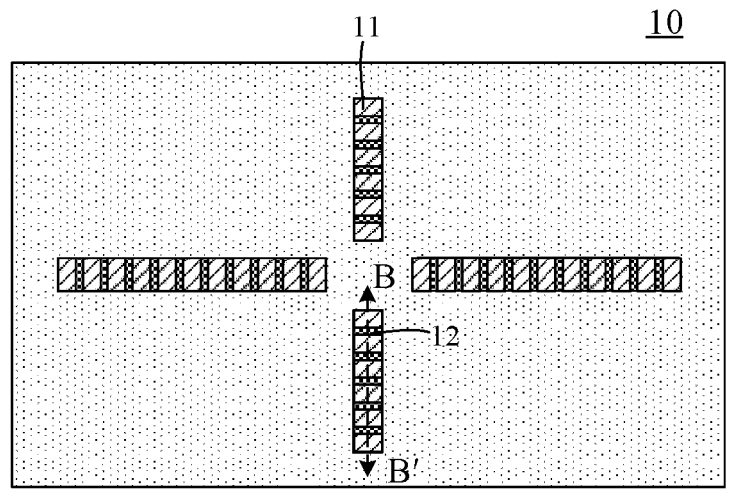
FIG. 10 is a top view of a cover of another display panel provided by some embodiments of the present disclosure.
Figure 11:
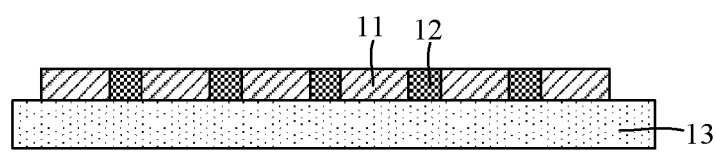
FIG. 11 is a cross-sectional view taken along line B-B' shown in FIG. 10.

FIG. 10 is a top view of a cover of another display panel provided by some embodiments of the present disclosure. FIG. 11 is a cross-sectional view taken along line B-B' shown in FIG. 10. As shown in FIG. 10, multiple connection electrodes 11 that are aligned in a same direction are provided in an electrode region, and an insulation part 12 is provided between adjacent connection electrodes 11 and is configured to space apart two adjacent connection electrodes 11 from each other to prevent the connection electrodes 11 from short-circuit. As shown in FIG. 11, the cover 10 includes a substrate 13, the connection electrodes 11 are located on a side of the substrate 13, both the connection electrodes 11 and the insulation part 12 are formed with an etching process, and the insulation part 12 is located between the adjacent connection electrodes 11. The connection electrode 11 is made of a metal material or a transparent conductive material. The material of the connection electrode 11 includes, but is not limited to, copper, molybdenum, aluminum, titanium, magnesium, indium tin oxide, indium zinc oxide, zinc oxide, and indium oxide. The insulation part 12 is made of an inorganic material including, but not limited to, silicon oxide, silicon nitride, silicon oxynitride.

Figure 12:
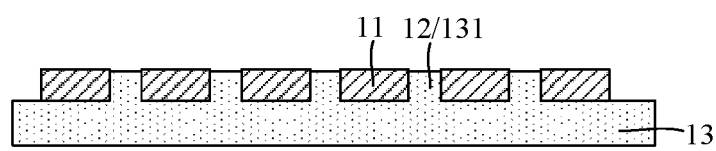
FIG. 12 is another cross-sectional view taken along line B-B' shown in FIG. 10.

FIG. 12 is another cross-sectional view taken along line B-B' shown in FIG. 10. In other embodiments, as shown in FIG. 12, the cover 10 includes a substrate 13, the substrate 13 is etched to form protrusions 131, a recess is formed between adjacent protrusions 131, the connection electrode 11 is fabricated in the recess, and the insulation part 12 is formed by the protrusion 131 to space the adjacent connection electrodes 11 apart from each other. In the embodiments, the insulation part 12 and the substrate 13 are formed into one piece.

In some embodiments, the pin 21 is made of a metal material or a transparent conductive material, and the material of the pins 21 includes, but is not limited to, copper, molybdenum, aluminum, titanium, magnesium, indium tin oxide, indium zinc oxide, zinc oxide, and indium oxide.

In some embodiments, the pin 21 and the connection electrode 11 include a same material, which can reduce the variety of raw materials and simplify the process.

In some embodiments, both the pin 21 and the connection electrode 11 include a metal material. In the embodiments, a light-blocking layer 14 can be provided between the connection electrode 11 and the substrate 13 and be configured to absorb light to prevent reflection of ambient light at the connection electrode 11 and the pin 21.

In some embodiments, both the pin 21 and the connection electrode 11 include a transparent conductive material. The overall light transmission of the display panel can be improved when the embodiments are used in transparent display.

Figure 13:
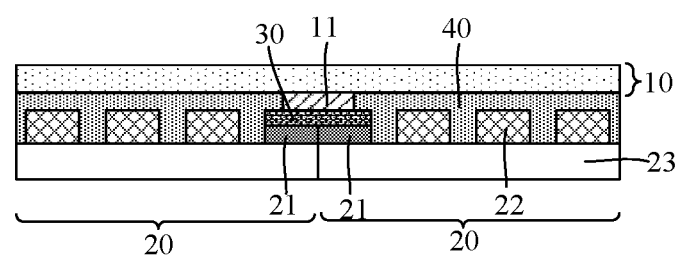
FIG. 13 is another cross-sectional view taken along line A-A' shown in FIG. 1.

FIG. 13 is another cross-sectional view taken along line A-A' shown in FIG. 1. In some embodiments, as shown in FIG. 13, the display panel includes an adhesive layer 40 through which the display unit 20 is bonded to the cover 10. The adhesive layer 40 is an optically clear adhesive. The adhesive layer 40 fills a gap between the display unit 20 and the cover 10. The embodiments of the present disclosure use the connection electrodes 11 on the cover 10 to provide a conduction path and realize the communication between the spliced display units without providing an adapter plate between adjacent display units 20 for connection, which can reduce the splicing gap between adjacent display units 20, reduce the dark fringe and improve the display effect. At the same time, with the configuration where the display unit 20 is bonded to the cover 10 through the adhesive layer 40, each display unit 20 is fixedly bonded to cover 10 so that multiple display units 20 are spliced into a whole. An opposite area between each display unit 20 and cover 10 is relatively large, then an overall area of the adhesive layer 40 is relatively large. With the adhesive layer 40, the mechanical stability of a whole spliced structure of the display panel is ensured.

With the embodiments of the present disclosure where the display units 20 are spliced on a same cover 10, the light-emitting elements of the display units 20 have a good consistency of light-emitting height, which can improve the brightness uniformity.

In some embodiments, taking the display panel as a whole, the adhesive layer 40 is a patterned structure, and one patterned adhesive layer 40 is formed between each display unit 20 and the cover 10.

In other embodiments, the adhesive layers 40 between the display units 20 and the cover 10 are connected to each other. That is, when taking the display panel as a whole, the adhesive layer 40 is a whole layer, which can increase the bonding area of the adhesive layer 40 between the cover 10 and the display unit array and improve the mechanical stability of the overall structure. When manufacturing the display panel, the entire surface of the cover 10 close to the display units 20 can be coated with the adhesive layer 40 while avoiding the locations of the connection electrodes 11, and then the cover 10 coated with the adhesive layer 40 is aligned and attached to the display unit 20.

Figure 14A:
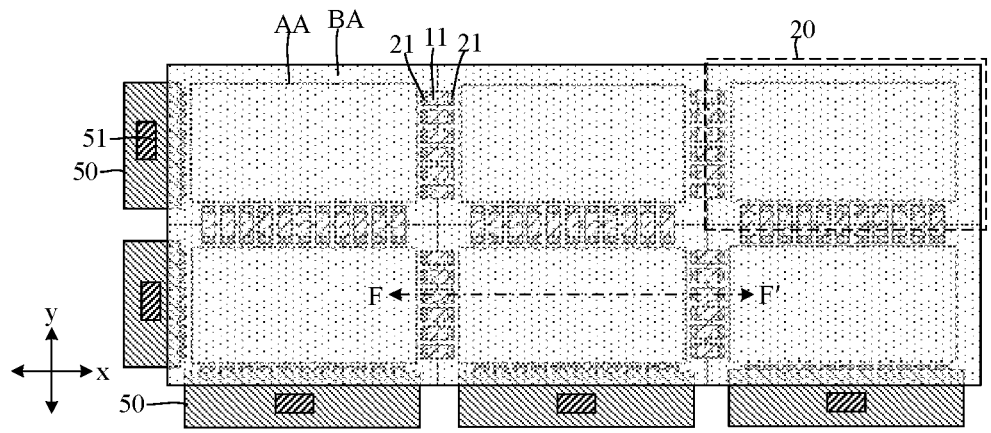
FIG. 14A is a schematic diagram of another display panel provided by some embodiments of the present disclosure.
Figure 14B:
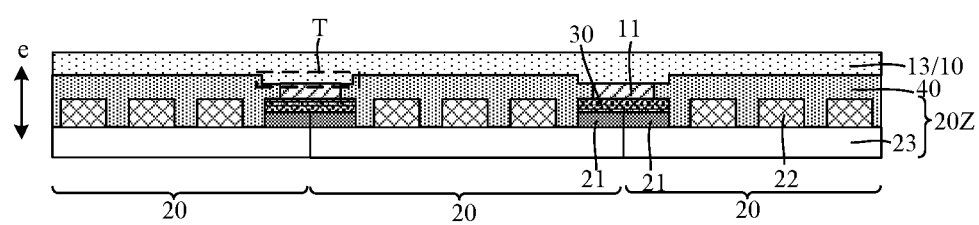
FIG. 14B is a cross-sectional view taken along line F-F' shown in FIG. 14A.

FIG. 14A is a schematic diagram of another display panel provided by some embodiments of the present disclosure. FIG. 14B is a cross-sectional view taken along line F-F' shown in FIG. 14A. In some embodiments, as shown in FIG. 14A, the display panel includes six display units 20 arranged in a matrix of two rows and three columns. As shown in FIG. 14B, the cover 10 includes a substrate 13, and a side of the substrate 13 close to the display unit array 20Z is provided with a protruding part T protruding from a surface of the substrate 13 towards the display units 20, and the connection electrode 11 overlaps with the protruding part T in a direction e perpendicular to a plane of the substrate 13. The protruding part T is a protruding structure on the surface of the substrate 13, and a recessed region is formed between adjacent protruding parts T. In some embodiments, the pixel region AA in the display unit 20 is opposite to the recessed region. During the manufacturing process, the substrate 13 can be etched to form the protruding part T, and then the connection electrode 11 can be fabricated on the protruding part T so that the connection electrode 11 and the protruding part T overlap. In this way, the connection electrode 11 can be in contact with the region where the pin 21 is located first when the cover 10 and the display unit 20 are attached to each other in alignment, which facilitates attaching and bonding. In the embodiments, the pixel region AA is accommodated in the recessed region located between adjacent protruding parts T, which facilitates the thinning of the overall thickness of the display panel.

Figure 15:
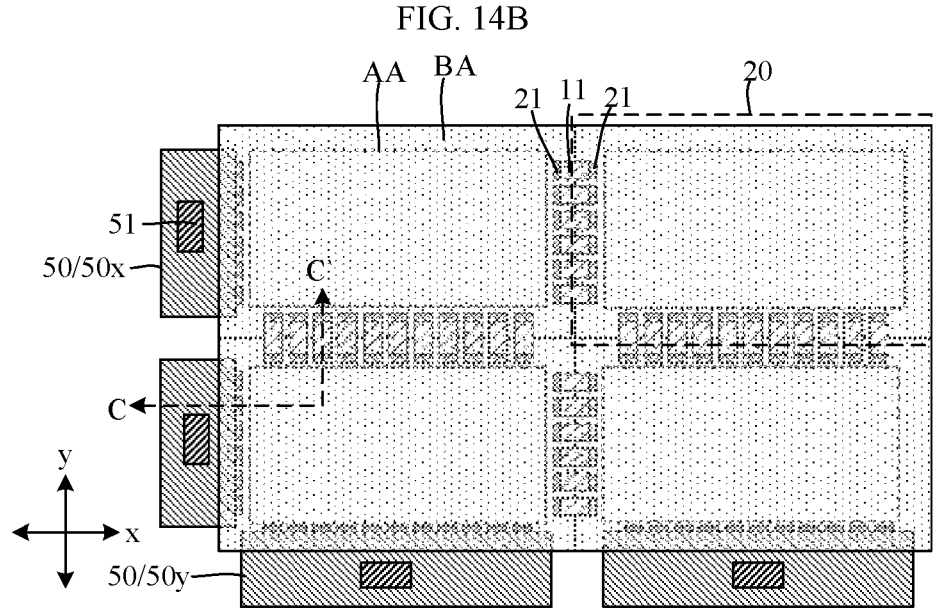
FIG. 15 is a schematic diagram of another display panel provided by some embodiments of the present disclosure.
Figure 16:
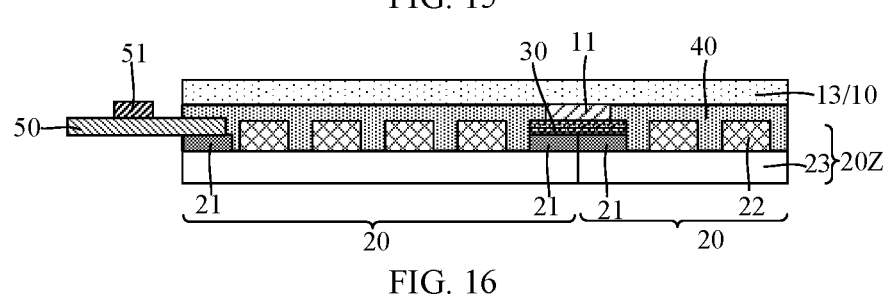
FIG. 16 is a cross-sectional view taken along line C-C' shown in FIG. 15.

FIG. 15 is a schematic diagram of another display panel provided by some embodiments of the present disclosure, and FIG. 16 is a cross-sectional view taken along line C-C' shown in FIG. 15. In some embodiments, as shown in FIG. 15, the display panel also includes a driver structure 50 bonded on a periphery of the display unit array 20Z. As shown in FIG. 16, the driver structure 50 is bonded to the display unit 20 located at an edge of the display unit array 20Z, and the driver structure 50 is bonded to the pin 21 located at the edge of the display unit 20. The driver structure 50 can be a flexible circuit board, and a driver chip 51 is fixed on the driver structure 50. In the embodiments, the driver structure 50 is bonded on the periphery of the display unit array 20Z, and the position where the driver structure 50 is bonded does not occupy a space of the back of the display unit 20, and it is applied in the transparent display to improve the light transmission rate of the display panel and improve the visual effect.

In some embodiments, as shown in FIG. 15, the driver structures 50 include a first driver structure 50x bonded to at least one side of the display unit array in the first direction x, and a second driver structure 50y bonded to at least one side of the driver structure 50 in the second direction y. The first direction x and the second direction y intersect. The display unit 20 includes selecting lines each extending along the first direction x, and data lines each extending along the second direction y. The first driver structure 50x is configured to provide signals to the selecting lines, and the second driver structure 50y is configured to provide signals to the data lines.

In some embodiments, the selecting lines include a gate signal line and a light-emitting control signal line. The display unit includes multiple pixel circuits. The pixel circuit includes a driving transistor, a data writing transistor, a gate reset transistor, and a light-emitting control transistor. A gate of the data writing transistor and a gate of the gate reset transistor are electrically connected to the gate signal line, and a gate of the light-emitting control transistor is electrically connected to the light-emitting control signal line. An input terminal of the data writing transistor is electrically connected to the data line.

In other embodiments, the display unit includes multiple pixel switches and multiple pixel electrodes, the selecting lines include a gate signal line, a gate of the pixel switch is electrically connected to the gate signal line, an input terminal of the pixel switch is electrically connected to the data line, and an output terminal of the pixel switch is electrically connected to the pixel electrode.

FIG. 15 exemplarily illustrates that the display unit array includes four display units 20 arranged in a matrix of two rows and two columns. In some embodiments, the pins 21 of two adjacent display units 20 arranged in the first direction x are electrically connected to each other through the connection electrode 11 on the cover 10, and the pins 21 of two adjacent display units 20 arranged in the second direction y are electrically connected to each other through the connection electrode 11 on the cover 10. The first driver structure 50x is configured to drive the selecting lines in the two display units 20 that are arranged in the first direction x, and the second driver structure 50y is configured to drive the data lines in the two display units 20 that are arranged in the second direction y, which can realize synchronization of the signals of the display units 20 arranged in the first direction x and realize synchronization of the signals of the display units 20 arranged in the second direction y.

Figure 17:
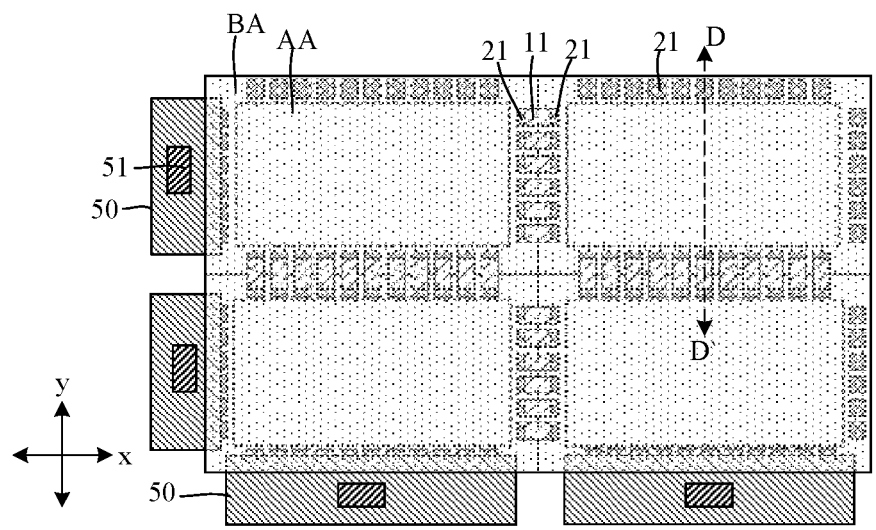
FIG. 17 is a schematic diagram of another display panel provided by some embodiments of the present disclosure.
Figure 18:
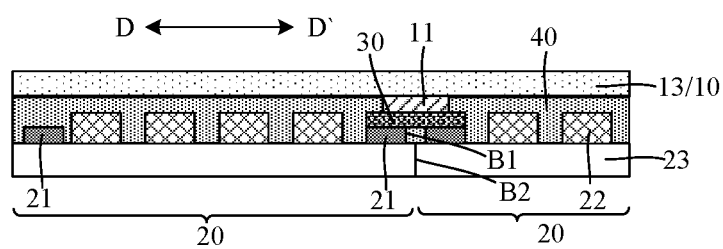
FIG. 18 is a cross-sectional view taken along line D-D' shown in FIG. 17.

FIG. 17 is a schematic diagram of another display panel provided by some embodiments of the present disclosure, and FIG. 18 is a cross-sectional view taken along line D-D' shown in FIG. 17. In conjunction with FIG. 17 and FIG. 18, at a side of the display unit array in the first direction x where no driver structure 50 is bonded, the display unit 20 includes a pin that is floated; and at a side of the display unit array in the second direction y where no driver structure 50 is bonded, another display unit 20 includes a pin that is floated. As shown in FIG. 18, the adhesive layer 40 covers the floated pins 21 at an edge of the display panel, so that the adhesive layer 40 protects the floated pins 21. In the embodiments, pins 21 are provided at multiple edges around the display unit 20, so there is no need to provide special design for the display units 20 spliced at the edge of the display unit array, and all display units 20 can be manufactured in a same process. When splicing multiple display units 20, there is no need to select specific display units 20 for different locations in the display unit array (e.g., edge and center), simplifying the process.

In some embodiments, the display units 20 are rectangular, and pins 21 are provided at all four sides of each display unit 20, so that all display units 20 can be manufactured in a same process, simplifying the manufacturing process of the display unit 20.

In some embodiments, as shown in FIG. 18, an edge B1 of the pin 21 is recessed inward with respect to an edge B2 of the display unit 20. Such configuration ensures that the sides of the display panel do not expose the edges of the pins 21 and prevents the pins 21 from being corroded.

In other embodiments, the edge B1 of the pin 21 is recessed inwards relative to the edge B2 of the display unit 20, which also prevents the pins 21 from contacting each other to avoid short-circuit between the pins 21 at the splicing positions. For example, when two adjacent pins 21 of two display units 20 do not correspond to each other, that is, when signal lines in the display units 20 respectively electrically connected to the two pins 21 transmit different signals, the two pins 21 can be prevented from contacting with each other to prevent short-circuit, which avoiding signal misalignment and does not affect the display. For another example, when two display units 20 are spliced and the pin 21 of one display unit 20 overlap with two pins 21 of the other display unit 20, the inward-offset arrangement of the edge B1 of the pin 21 relative to the edge B2 of the display unit 20 can also avoid that the pin 21 of one display unit 20 is connected to the two pins 21 of the other display unit 20.

In some embodiments, as shown in FIG. 15, for any splicing position in the display unit array, the pins 21 of two adjacent display units 20 are electrically connected to each other by the connection electrode 11. In these embodiments, the connection electrodes 11 of the cover 10 provide a conduction path to realize communication between the spliced display units, which can reduce the splicing gap between the adjacent display units 20, reduce the dark fringe, and improve the display effect. Direct communication between adjacent display units 20 in the embodiments achieves synchronization of signals of multiple display units 20 in the display panel.

Figure 19:
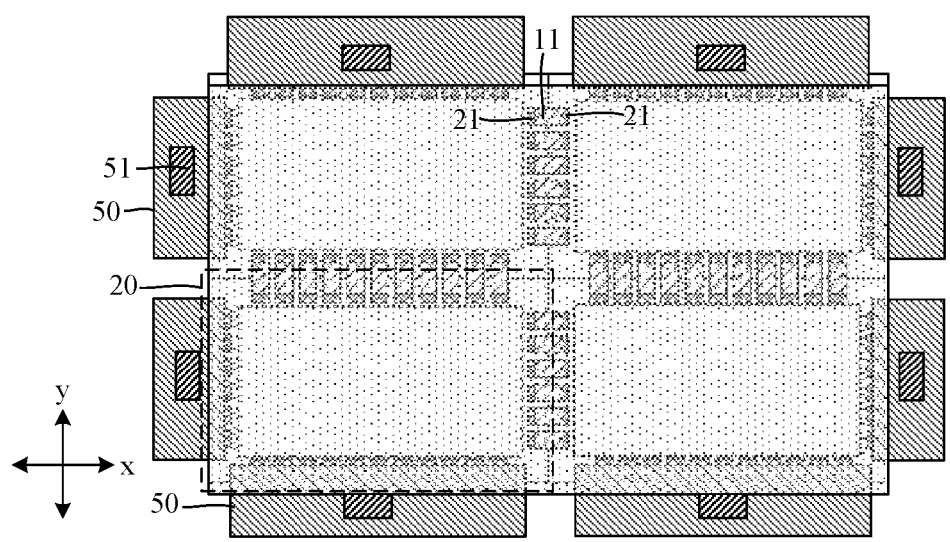
FIG. 19 is a schematic diagram of another display panel provided by some embodiments of the present disclosure.

FIG. 19 is a schematic diagram of another display panel provided by some embodiments of the present disclosure. As shown in FIG. 19, still taking the display unit array including four display units 20 as an example, it can be seen that each of two sides, opposite in the first direction x, of the display unit array is bonded with the driver structure 50, and each of two sides, opposite in the second direction y, of the display unit array is bonded with the driver structure 50. At any splicing position in the display unit array, the pins 21 of two adjacent display units 20 are electrically connected to each other by the connection electrode 11. In the embodiments, the signals of multiple display units 20 in the display panel are synchronized, and a bilateral and simultaneous driving is adopted at both the first direction x and the second direction y, which can improve the uniformity of display at all positions of the display panel. Taking the display units 20 arranged in the first direction x as an example and taking the display panel as a whole, the driver structures 50 provided at both sides of the first direction x provide signals to the selecting lines from both sides, which can reduce the signal differences on the selecting lines of the display units 20 arranged in the first direction x and improve the display uniformity.

Figure 20:
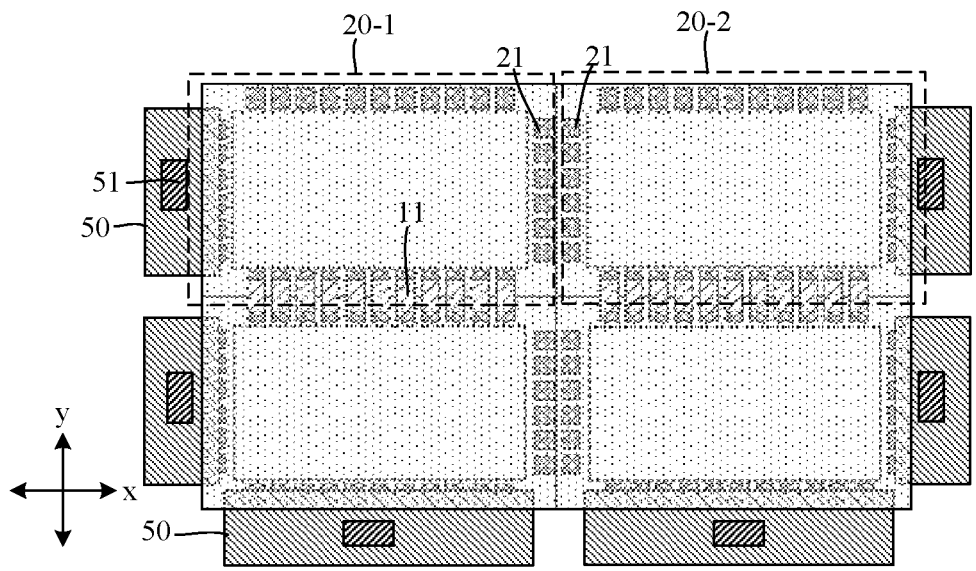
FIG. 20 is a schematic diagram of another display panel provided by some embodiments of the present disclosure.

FIG. 20 is a schematic diagram of another display panel provided by some embodiments of the present disclosure. In some embodiments, as shown in FIG. 20, the driver structures 50 are bonded to both sides of the display unit array in the first direction x. The display panel includes a first display unit 20-1 and a second display unit 20-2 spliced together. The first display unit 20-1 and the second display unit 20-2 are adjacent and spliced in the first direction x, and the pins 21 of the first display unit 20-1 are disconnected from the pins 21 of the second display unit 20-2 at a position where the first display unit 20-1 and the second display unit 20-2 are spliced. In the embodiments, the first display unit 20-1 and the second display unit 20-2 do not communicate with each other through the pins 21, the first display unit 20-1 is driven by a driver structure 50 bonded to a left side of the display unit array, and the second display unit 20-2 is driven by another driver structure 50 bonded to a right side of the display unit array, so that a bilateral driving of the display panel in the first direction x can be realized, and the display of the first display unit 20-1 can be independent from the display of the second display unit 20-2, thereby increasing the display application scenarios of the display panel.

Figure 21:
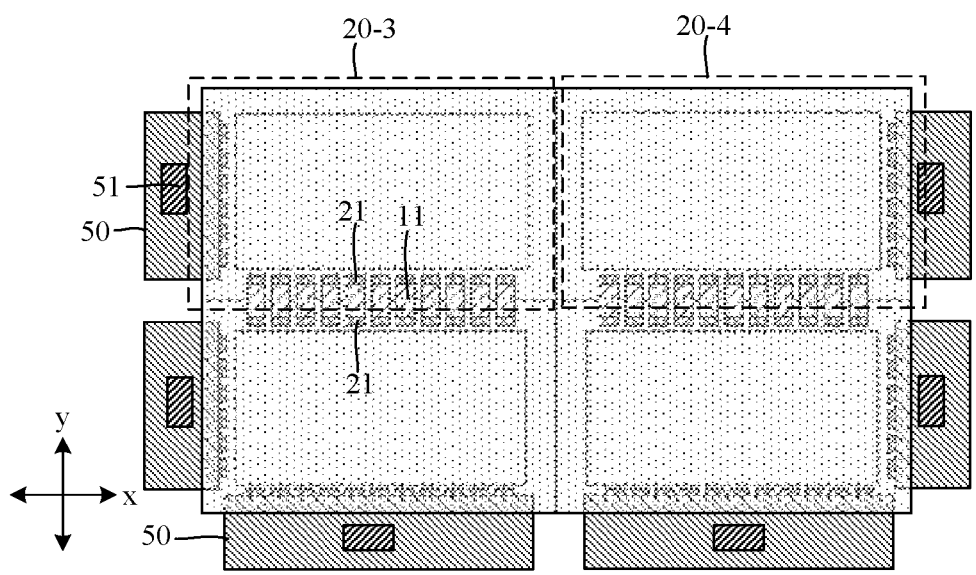
FIG. 21 is a schematic diagram of another display panel provided by some embodiments of the present disclosure.

FIG. 21 is a schematic diagram of another display panel provided by some embodiments of the present disclosure. In some embodiments, as shown in FIG. 21, the driver structures 50 are bonded to two sides of the display unit array in the first direction x. The display panel includes a third display unit 20-3 and a fourth display unit 20-4 that are spliced. The third display unit 20-3 and the fourth display unit 20-4 are adjacent and spliced in the first direction x. The third display unit 20-3 and fourth display unit 20-4 are not provided with pins 21 at the splicing position of the third display unit 20-3 and the fourth display unit 20-4. In the embodiments, the third display unit 20-3 and the fourth display unit 20-4 do not communicate with each other via the pins 21, the third display unit 20-3 is driven by the driver structure 50 bonded to the left side of the display unit array, and the fourth display unit 20-4 is driven by the driver structure 50 bonded to the right side of the display unit array. Such configuration can enable the display panel to be driven at both sides of the first direction x. The display of the third display unit 20-3 and the display of the fourth display unit 20-4 can be independent from each other, which can increase the display application scenarios of the display panel. In the embodiments, the pins 21 are provided only at the splicing position where communication connection is required, and no pins 21 are provided at the splicing position where communication connection is not required, which can save the raw manufacturing materials.

The above embodiments illustrate a display panel including four display units. In other embodiments, as shown in FIG. 14A, the display panel includes six display units 20 arranged in a matrix of two rows and three columns, driver structures 50 are bonded to one side of the display unit array in the first direction x, and other driver structures 50 are bonded to one side of the display unit array in the second direction y. At any splicing position, the pins 21 of two display units 20 are electrically connected to each other through the connection electrode 11 on the cover 10. In the embodiments, any two adjacent display units 20 can communicate with each other. Multiple display units 20 arranged in the first direction x can be driven by a driver structure 50 bonded in the first direction x, and multiple display units 20 arranged in the second direction y can be driven by a driver structure bonded in the second direction y. FIG. 14A illustrates that the display panel is driven in a unilateral driving manner.

In other embodiments, for a display panel including six display units 20 arranged in a matrix of two rows and three columns, when the driver structures 50 are bonded to both sides of the display unit array in the first direction x, and/or when the driver structures 50 are bonded to both sides of the display unit array in the second direction y, the display panel is driven in a bilateral driving manner, which is not illustrated in figures herein.

Referring to the embodiments of FIG. 20 and FIG. 21, at least two adjacent display units 20 of the six display units 20 arranged in a matrix of two rows and three columns do not communicate with each other, so that different display regions of the display panel can be displayed independently of each other.

The number of display units 20 in the embodiments of the present disclosure is not limited, and the display panel includes n*m display units 20 arranged in a matrix of n rows and m columns, where n and m are positive integers, and n and m are not equal to one at the same time.

Figure 22:
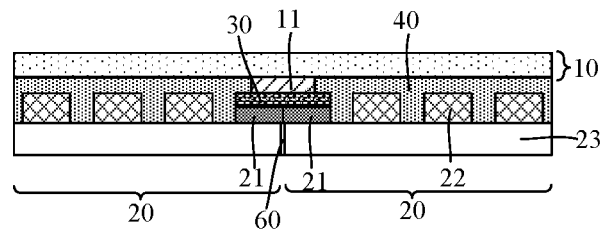
FIG. 22 is another cross-sectional view taken along line A-A' shown in FIG. 1.

FIG. 22 shows another cross-sectional view taken along line A-A' shown in FIG. 1. In some embodiments, as shown in FIG. 22, the splicing gap between the adjacent display units 20 is filled with adhesive material 60. The adhesive layer 40 is interposed between the display units 20 and the cover 10. The adhesive layer 40 is used for bonding the display units 20 and the cover 10 that are opposite to each other, and the adhesive material 60 is used for bonding sidewalls of the spliced display units 20, which makes the display panel as a whole be spliced more firmly.

In some embodiments, a material of the adhesive material 60 is the same as the material of the adhesive layer 40.

In some embodiments, when manufacturing the display panel, in the process of attaching the display unit 20 and the cover 10, the adhesive layer 40 used to bond the display unit 20 and the cover 10 is dispersed into the splicing gap between the adjacent display units 20 to form the adhesive material 60.

In some embodiments, the cutting process is more precise, and the edges of the display unit 20 are narrow after cutting, so that the splicing gap between the two adjacent display units 20 are very small, which can be regarded that no splicing gap is formed between the two adjacent display units 20.

Figure 23:
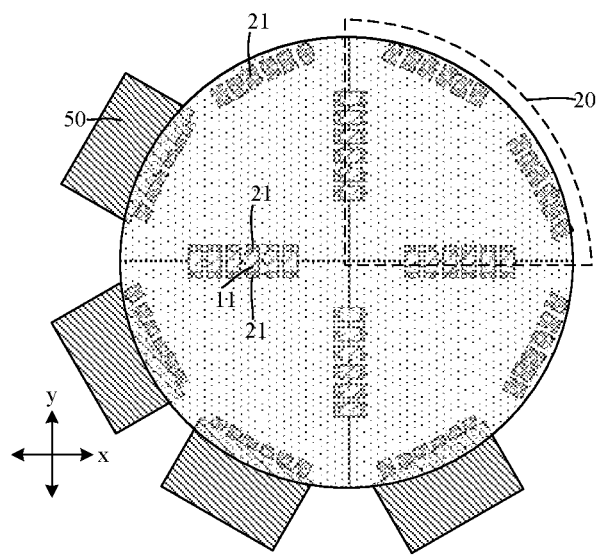
FIG. 23 is a schematic diagram of another display panel provided by some embodiments of the present disclosure.

In the above embodiments, the display unit 20 is shown as a rectangle. FIG. 23 is a schematic diagram of another display panel provided by some embodiments of the present disclosure. In some embodiments, as shown in FIG. 23, the display panel is circular, and the display panel includes multiple sector-shaped display units 20. At at least one splicing position, the pins 21 of two adjacent display units 20 are electrically connected to each other through the connection electrode 11 on the cover. Driver structures 50 are bonded to a periphery of the display unit array. At least one side of the display unit array in the first direction x each is bonded with one driver structures 50, and at least one side of the display unit array in the second direction y each is bonded with another driver structures 50. In the irregular-shaped display panel (i.e., non-rectangular display panel) illustrated in FIG. 23, each display unit 20 also includes selecting lines and data lines that are supplied with signals. In an example where the selecting line each extend along the first direction x and the data lines each extend along the second direction y, the first direction x and the second direction y are perpendicular to each other. The driver structure 50 is bonded to at least one side of the display unit array in the first direction x. Thus, it is understood that the driver structure 50 is bonded to at least one side of an extending direction of the selecting line. The driver structure 50 is bonded to at least one side of the display unit array in the second direction y. Thus, it is understood that the driver structure 50 is bonded to at least one side of an extending direction of the data line.

FIG. 23 illustrates that four display units 20 are spliced together to form a substantially circular display unit array, and a splicing gap between two adjacent display units 20 are parallel to the first direction x or the second direction y. In other embodiments, five or more sector-shaped display units 20 are spliced together to form a substantially circular display unit array, and a splicing gap between two adjacent display units 20 is parallel to neither the first direction x nor the second direction y.

In some embodiments, the display unit 20 can also be triangular or have other shapes, and the shape of the display unit 20 can be designed according to the shape of the display panel formed by the final spliced the display unit 20.

Figure 24:
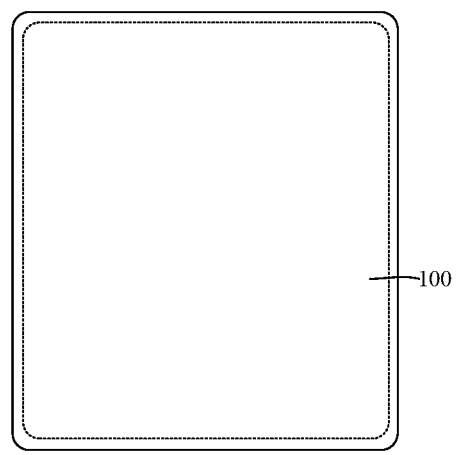
FIG. 24 is a schematic diagram of a display apparatus provided by some embodiments of the present disclosure.

Some embodiments of the present disclosure provide a display apparatus, and FIG. 24 is a schematic diagram of a display apparatus provided by some embodiments of the present disclosure. As shown in FIG. 24, the display apparatus includes a display panel 100 provided by any embodiment of the present disclosure. The structure of the display panel 100 has been described in the above embodiments and will not be repeated herein. The display apparatus provided by some embodiments of the present disclosure can be, for example, a large-sized display apparatus, such as an information bulletin board or a billboard. The display apparatus can also be applied to scenarios with a transparent display, such as a store window, a window of a building and a window of a vehicle, or a transparent television.

Some embodiments of the present disclosure provide a method for manufacturing a display panel, and the method can be used to manufacture the display panel provided by the embodiments of the present disclosure. The embodiments of the method for manufacturing a display panel can be understood in conjunction with the above embodiments of the display panel.

Figure 25:
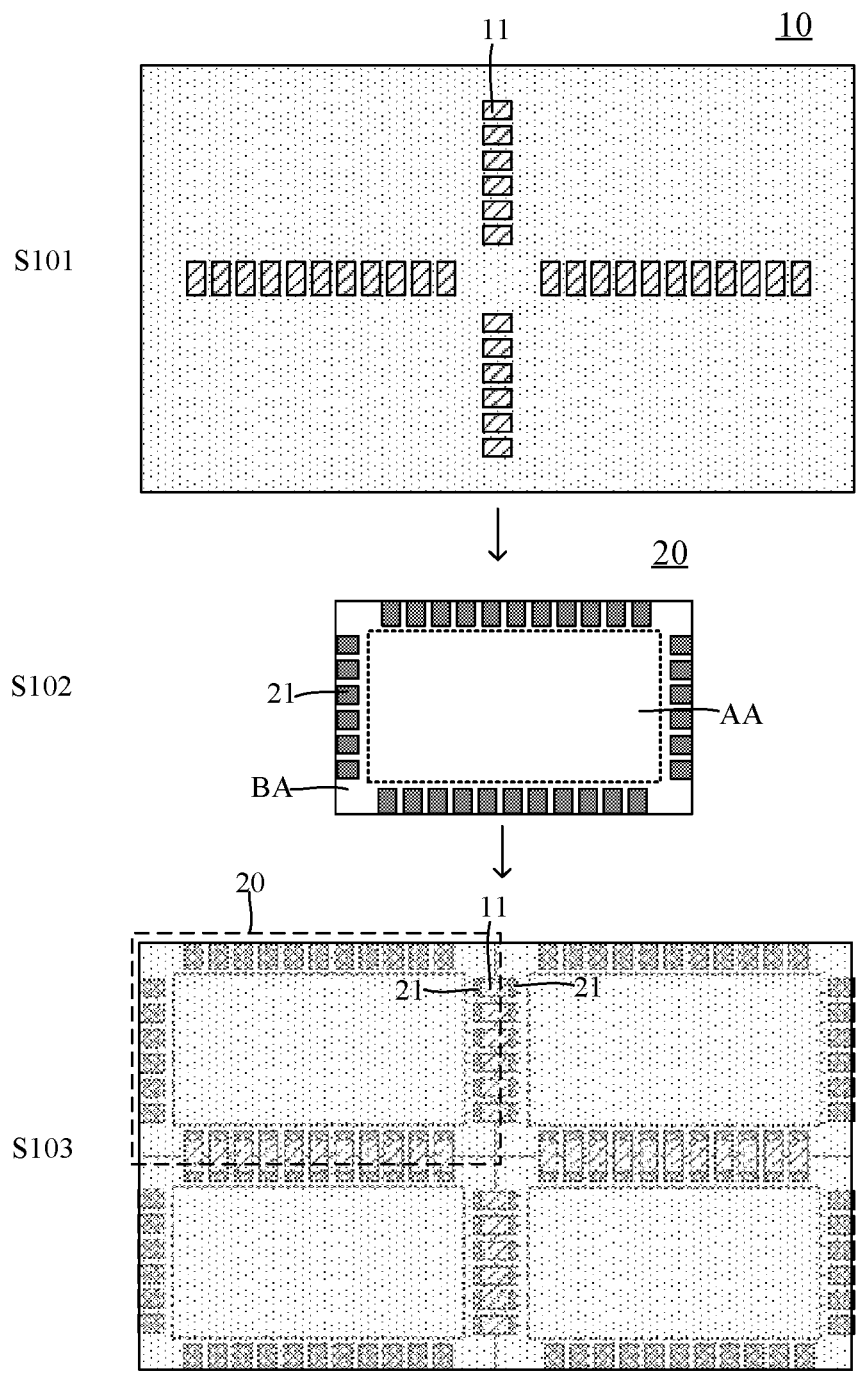
FIG. 25 is a flowchart of a method for manufacturing a display panel provided by some embodiments of the present disclosure.

FIG. 25 is a flowchart of a method for manufacturing a display panel provided by some embodiments of the present disclosure. As shown in FIG. 25, the method includes steps S101, S102, and S103.

At step S101, a substrate 13 is provided, and connection electrodes 11 are formed on the substrate 13 to form a cover 10 including the connection electrodes 11. The positions of the connection electrodes 11 are set according to predetermined splicing positions. In an example where four display units are predetermined to be spliced together, four electrode regions are formed on the substrate 13, and multiple connection electrodes 11 that are insulated from each other are provided in each electrode region.

In some embodiments, the connection electrodes 11 are fabricated on the substrate 13 using a patterning process. The connection electrodes 11 are fabricated with a high precision, and the fabricating process of the connection electrodes 11 does not affect the structure of the display unit 20.

At step S102, at least two display units 20 are provided, where each display unit 20 has a pixel region AA, a peripheral region BA at least partially surrounding the pixel region AA, and multiple pins 21 provided in the peripheral region BA. The display unit 20 is shown in a rectangular shape, the pins 21 are formed at all four sides of the display unit 20, and the number of the pins 21 is set according to specific needs. Multiple light-emitting elements are provided in the pixel region AA and are organic light-emitting elements or inorganic light-emitting elements. In other embodiments, the display unit 20 is a liquid crystal display panel, and liquid crystal molecules, common electrodes, and pixel electrodes are provided in the pixel region AA.

At step S103, the at least two display units 20 are aligned with and attached to the cover 10 so that the at least two display units 20 are spliced to form a display unit array, and the display unit array is opposite to the cover 1. At the at least one splicing position, the pins 21 of two adjacent display units 20 are electrically connected to each other by the connection electrode 11.

The embodiment of the present disclosure does not limit the sequence of step S101 and step S102, and the sequence of step S101 and step S102 can be interchanged, or step S101 and step S102 can be performed simultaneously. FIG. 25 illustrates that the cover 10 may be formed first.

In the method for manufacturing the display panel provided by the embodiments of the present disclosure, the connection electrodes 11 are formed on the cover 10, and the connection electrodes 11 are utilized to provide conduction paths for realizing communication between the spliced display units without setting an adapter plate between adjacent display units 20 for connection, which can reduce the splicing gap between adjacent display units 20, reduce the dark fringe, and improve the display effect.

Figure 26:
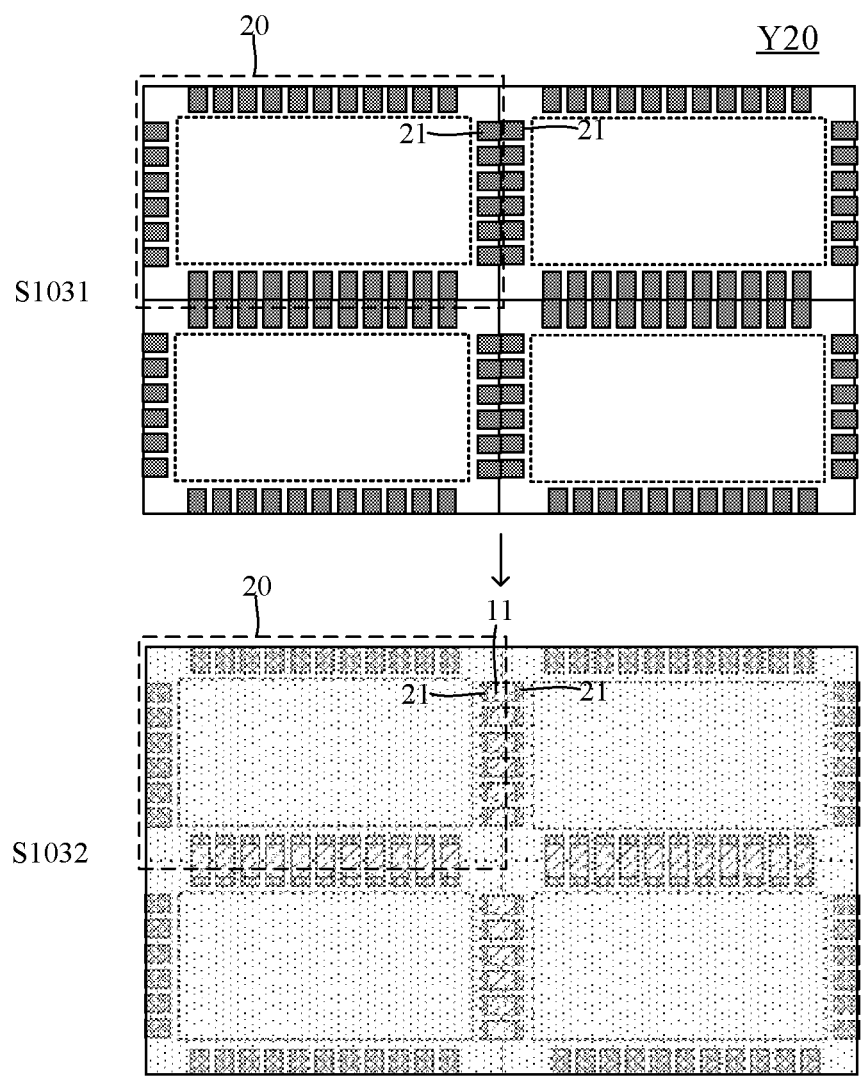
FIG. 26 is a flowchart of another method for manufacturing a display panel provided by some embodiments of the present disclosure.

FIG. 26 is a flowchart of another method for manufacturing a display panel provided by some embodiments of the present disclosure, and the method provided by the embodiments of FIG. 26 can be understood in conjunction with the embodiments of FIG. 25. In some embodiments, the method includes steps S101, S102, S1031, and S1032.

At step S101, a substrate 13 is provided, and connection electrodes 11 are formed on the substrate 13 to form a cover 10 including the connection electrodes 11.

At step S102, at least two display units 20 are provided, where each display unit 20 has a pixel region AA, a peripheral region BA at least partially surrounding the pixel region AA, and multiple pins 21 in the peripheral region BA.

The step S103 of aligning and attaching the at least two display units 20 to the cover 10 is illustrated in FIG. 26 and includes Steps S1031 and S1032.

At step S1031, the at least two display units 20 are pre-spliced to each other to form a splicing array Y20. FIG. 26 schematically illustrates that four display units 20 are spliced to each other to form a 2*2 splicing array Y20.

At step S1032, the splicing array Y20 is aligned with and attached to the cover 10, and at at least one splicing position, the pins 21 of the two adjacent display units 20 are electrically connected to each other by the connection electrode 11.

In the method for manufacturing the display panel provided by the embodiments of the present disclosure, the at least two display units 20 are first pre-spliced together to form the splicing array Y20, and then the splicing array Y20 as a whole is aligned and attached to the cover 10, so that the process for bonding the pins 21 and the connection electrodes 11 at all splicing positions can be completed in one step, which can improve the yield.

In some embodiments, the method also includes the process of bonding the driver structures. In some embodiments, after step S1031 of forming the splicing array Y20, the driver structures are bonded to target positions, and after bonding the driver structures, step S1032 is performed.

Figure 27:
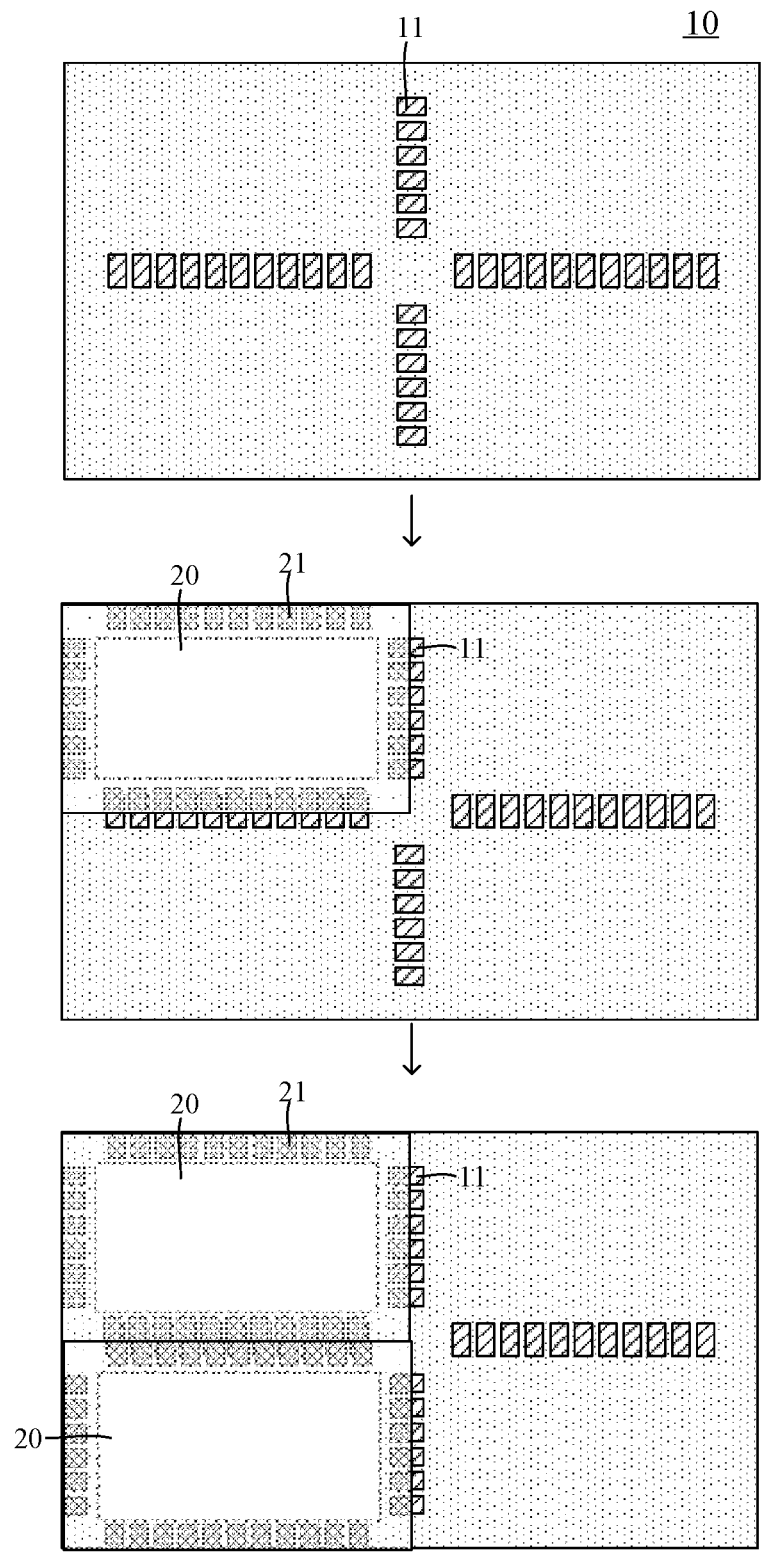
FIG. 27 is a flowchart of another method for manufacturing a display panel provided by some embodiments of the present disclosure.

FIG. 27 shows a flowchart of another method for manufacturing a display panel provided by some embodiments of the present disclosure. In some embodiments, as shown in FIG. 27, the step S103 of aligning and attaching the at least two display units 20 to the cover 10 includes: aligning and attaching the at least two display units 20 to the cover 10. FIG. 27 illustrates only the step of aligning two display units 20 to the cover 10 one by one. In the method for manufacturing the display panel provided by the embodiments, the display units 20 are aligned and attached to the cover 10 one by one, and the processes for bonding the pins 21 and the connection electrodes 11 at the splicing positions between the display units 20 are performed separately, and each bonding process is performed corresponding to only one electrode region, which can ensure the accuracy of the alignment and bonding.

In some embodiments, the method also includes, after step S103 of aligning and attaching the at least two display units 20 to the cover 10, injecting an adhesive layer 40 between the display unit array and the cover 10 opposite to the display unit array so that a gap between each display unit 20 and the cover 10 is filled by the adhesive layer 40. The display panel manufactured with the method provided by the embodiments can be referred to in the structure of the above embodiments of FIG. 13. The adhesive layer 40 has a good fluidity during the manufacturing process and is able to fill the gap between each display unit 20 and the cover 10. Part of the adhesive layer 40 may fill the splicing gap between two adjacent display units 20, so that sidewalls of display units 20 are bonded to each other at the splicing position. In the embodiments, each display unit 20 is fixedly bonded to the cover 10 by the adhesive layer 40, so that multiple display units 20 can be spliced together to one piece. An opposite area between each display unit 20 and cover 10 is relatively large, then an overall area of the adhesive layer 40 is relatively large. With the adhesive layer 40, the mechanical stability of a whole spliced structure of the display panel is ensured.

Figure 28:
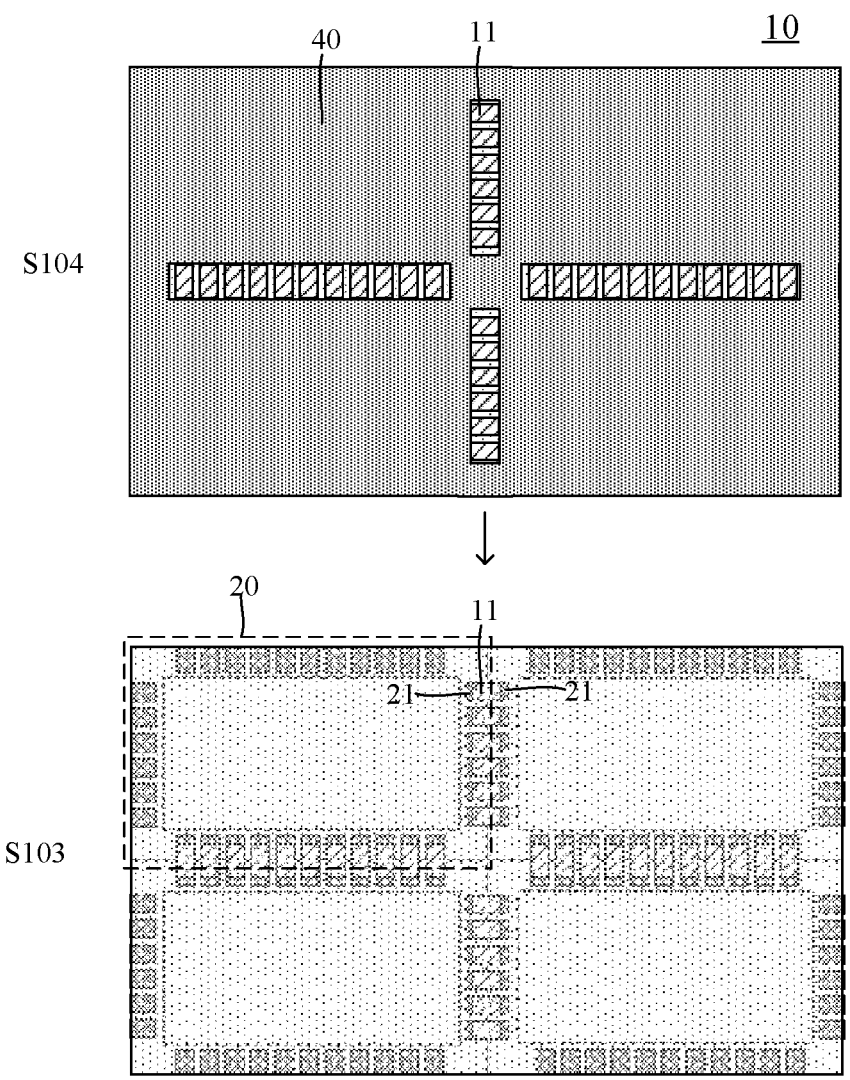
FIG. 28 is a flowchart of another method for manufacturing a display panel provided by some embodiments of the present disclosure.

FIG. 28 is a flowchart of another method for manufacturing a display panel provided by some embodiments of the present disclosure. In some embodiments, as shown in FIG. 28, before the step S103 of aligning and attaching the at least two display units 20 to the cover 10, the method also includes step S104.

At step S104, an adhesive layer 40 is coated on a side of the cover 10 provided with the connection electrodes 11, and the adhesive layer 40 avoids the connection electrodes 11.

At step S103, each display unit 20 is aligned and attached to the cover 10 coated with the adhesive layer 40.

In the method provided by the embodiments, the adhesive layer 40 is first coated on the cover 10 and avoids the connection electrodes 11, and the display units 20 are aligned and attached to the cover 10 by the adhesive layer 40. The pressing operation in the bonding process for the pins 21 and the connection electrodes 11 enables simultaneous squeezing of the adhesive layer 40 so that the adhesive layer 40 fills the gap between the cover 10 and the display unit 20.

Figure 29:
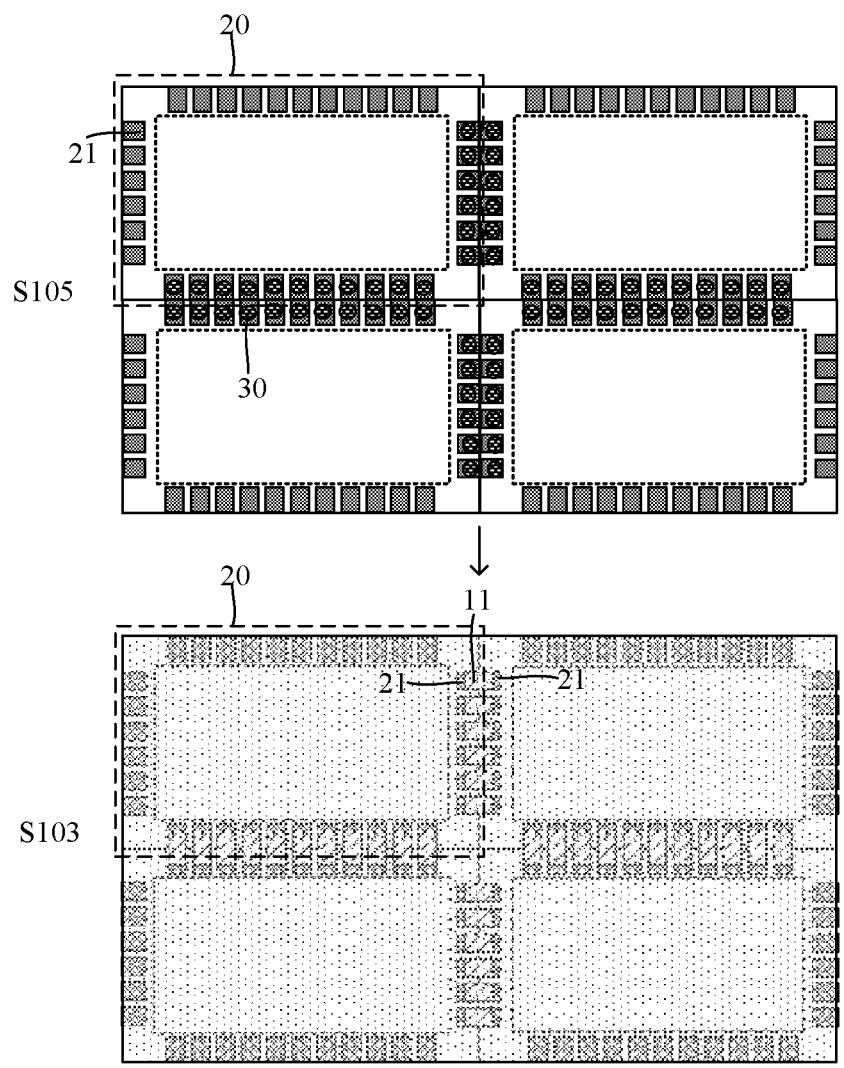
FIG. 29 is a flowchart of another method for manufacturing a display panel provided by some embodiments of the present disclosure.

FIG. 29 is a flowchart of another method for manufacturing a display panel provided by some embodiments of the present disclosure. In some other embodiments, as shown in FIG. 29, the method for manufacturing the display panel also includes step S105.

At step S105, conductive structures 30 are manufactured on the pins 21 of the display units 20 located at predetermined splicing position. Taking the conductive structures 30 being solder balls as an example, solder balls are respectively formed on the pins 21 that are aligned with each other, and the process of forming solder balls is also referred to as a ball-planting process. The embodiments of FIG. 29 schematically illustrate that multiple display units 20 are pre-spliced to form a splicing array, and then the conductive structure 30 are manufactured.

At step S103, the display units 20 are aligned and attached to the cover 10, and the pins 21 and the connection electrodes 11 are bonded and connected together by the conductive structures 30 at the at least one splicing position.

The conductive structures 30 in the embodiments not only electrically connect the pins 21 and the connection electrodes 11, but also bond and fix the pins 21 and the connection electrodes 11.

The above are merely exemplary embodiments of the present disclosure and are not intended to limit the present disclosure. Any modifications, equivalents, improvements, etc., which are made within the principles of the present disclosure, should fall into the scope of the present disclosure.

Finally, it should be noted that the above embodiments are only used to illustrate, rather to limit, the technical solution of the present disclosure. Although the present disclosure is described in details with reference to the above embodiments, it should be understood by those skilled in the art that they can still modify the technical solution recorded in the above embodiments, or to make equivalent replacement to some or all of the technical features thereof; and these modifications or replacements do not make the essence of the corresponding technical solution deviate from the scope of the technical solutions of all embodiments of the present disclosure.

What is claimed is:

1. A display panel, comprising:
a cover; and
a display unit array wherein the cover and the display unit array are arranged opposite of each other,
wherein the display unit array comprises at least two display units spliced together, and wherein each of the at least two display units comprises:
a pixel region, and
a peripheral region at least partially surrounding the pixel region,
wherein pins are provided in the peripheral region located at a splicing position of two adjacent display unit of the at least two display units, and the cover comprises connection electrodes,
wherein at the splicing position, the pins of the two adjacent display units are electrically connected by the connection electrodes,
wherein the cover comprises a substrate, and a light-blocking layer arranged between the connection electrodes and the substrate, and
wherein an orthogonal projection of the connection electrodes on a plane of the light-blocking layer is within the light-blocking layer.

2. The display panel according to claim 1, wherein two pins of the pins of the two adjacent display units are aligned with each other in an extending direction of the connection electrode.

3. The display panel according to claim 1, further comprising an adhesive layer through which a display unit of the at least two display units is bonded to the cover.

4. The display panel according to claim 1, wherein the cover comprises at least one electrode region, wherein at least two connection electrodes of the cover are arranged in the electrode region along a same direction, and wherein adjacent connection electrodes of the at least two connection electrodes are spaced apart from each other by an insulation part.

5. The display panel according to claim 1, wherein at the splicing position, the pin and the connection electrode are electrically connected to each other through a conductive structure.

6. The display panel according to claim 1, wherein the cover comprises a substrate in direct contact with the connection electrodes.

7. The display panel according to claim 1, wherein the cover comprises a substrate, wherein the substrate comprises protruding parts located on a side of the substrate close to the display unit array, wherein the protruding parts protrude from a surface of the substrate towards the at least two display units, respectively, and wherein a connection electrode of the connection electrodes overlaps a protruding part of the protruding parts in a direction perpendicular to a plane of the substrate.

8. The display panel according to claim 1, wherein the pin has an edge that is recessed with respect to an edge of the display unit.

9. The display panel according to claim 1, further comprising:
   driver structures bonded on a periphery of the display unit array.

10. The display panel according to claim 9, wherein at least one driver structure of the driver structures is bonded to at least one of two sides of the display unit array opposite to each other in a first direction, and at least another one driver structure of the driver structures is bonded to at least one of two sides of the display unit array opposite to each other in a second direction intersecting the first direction.

11. The display panel according to claim 1, wherein the connection electrodes are made of a metal material or a transparent conductive material, and the pins are made of a metal material or a transparent conductive material.

12. The display panel according to claim 1, wherein a splicing gap formed between adjacent display units is filled with an adhesive material.

13. A display apparatus, comprising a display panel, wherein the display panel comprises:
   a cover; and
   a display unit array wherein the cover and the display unit array are arranged opposite of each other,
   wherein the display unit array comprises at least two display units that are spliced together, and wherein each of the at least two display units comprises:
   a pixel region, a peripheral region at least partially surrounding the pixel region,
   wherein pins are provided in the peripheral region located at a splicing position of two adjacent display unit of the at least two display units, and the cover comprises connection electrodes,
   wherein at the splicing position, the pins of the two adjacent display units are electrically connected by the connection electrodes,
   wherein the cover comprises a substrate, and a light-blocking layer arranged between the connection electrodes and the substrate, and
   wherein an orthogonal projection of the connection electrodes on a plane of the light-blocking layer is within the light-blocking layer.

14. A method for manufacturing a display panel, comprising:
   providing a substrate;
   forming connection electrodes on the substrate to form a cover comprising the connection electrodes;
   providing at least two display units, wherein each of the display units comprises a pixel region, and a peripheral region at least partially surrounding the pixel region, pins are provided in the peripheral region located at a splicing position of two adjacent display unit of the at least two display units; and
   aligning and attaching the at least two display units to the cover in such a manner that the at least two display units are spliced to form a display unit array, wherein the display unit array is opposite to the cover, and at the splicing position, the pins of the two adjacent display units are electrically connected by the connection electrodes,
   wherein a light-blocking layer arranged between the connection electrodes and the substrate, and
   wherein an orthogonal projection of the connection electrodes on a plane of the light-blocking layer is within the light-blocking layer.

15. The method according to claim 14, wherein the aligning and attaching the at least two display units to the cover comprises:
   pre-splicing the at least two display units to form a splicing array; and
   aligning and attaching the splicing array to the cover.

16. The method according to claim 14, wherein the aligning and attaching the at least two display units to the cover comprises:
   aligning and attaching the at least two display units to the cover one at a time.

17. The method according to claim 14, further comprising:
   before aligning and attaching the at least two display units to the cover, forming conductive structures on the pins of the at least two display units at predetermined splicing positions,
   wherein the aligning and attaching the at least two display units to the cover comprises: bonding the pins and the connection electrodes through the conductive structures at a splicing position.

18. The method according to claim 14, wherein the forming connection electrodes on the substrate to form the cover comprises:
   forming the connection electrodes on the substrate through a patterning process.

* * * * *